(12) United States Patent
Thomas et al.

(10) Patent No.: US 11,469,955 B2
(45) Date of Patent: Oct. 11, 2022

(54) STACKED COMPUTER NETWORK DEVICES HAVING MULTIPLE MASTER NODES

(71) Applicant: ARRIS Enterprises LLC, Suwanee, GA (US)

(72) Inventors: Christopher Dwane Thomas, Chula Vista, CA (US); Renjith Kumar Ponnappan, Fremont, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 26 days.

(21) Appl. No.: 16/924,682

(22) Filed: Jul. 9, 2020

(65) Prior Publication Data
US 2021/0014118 A1 Jan. 14, 2021

Related U.S. Application Data

(60) Provisional application No. 62/872,585, filed on Jul. 10, 2019.

(51) Int. Cl.
| | |
|---|---|
| *H04L 41/0893* | (2022.01) |
| *H04L 45/58* | (2022.01) |
| *G06F 16/27* | (2019.01) |
| *H04L 41/042* | (2022.01) |
| *H04L 49/40* | (2022.01) |
| *H04L 67/1095* | (2022.01) |

(52) U.S. Cl.
CPC .......... *H04L 41/0893* (2013.01); *G06F 16/27* (2019.01); *H04L 41/042* (2013.01); *H04L 45/583* (2013.01); *H04L 49/40* (2013.01); *H04L 67/1095* (2013.01)

(58) Field of Classification Search
CPC . H04L 41/0893; H04L 45/583; H04L 41/042; H04L 49/40; H04L 67/1095; H04L 45/74; G06F 16/27
See application file for complete search history.

(56) References Cited

U.S. PATENT DOCUMENTS

| | | |
|---|---|---|
| 10,681,091 B2 | 6/2020 | Srinath et al. |
| 2014/0056319 A1 | 2/2014 | Hellwig |
| (Continued) | | |

OTHER PUBLICATIONS

International Search Report and the Written Opinion of the International Searching Authority corresponding to International Patent Application No. PCT/US2020/041094 (14 pages) (dated Oct. 2, 2020).

*Primary Examiner* — Walter J Divito
(74) *Attorney, Agent, or Firm* — Steven Stupp; Stewart Wiener

(57) ABSTRACT

An electronic device is described. The electronic device includes a stack of computer network devices, such as a stack of switches and/or routers. This stack of computer network devices includes data planes and ports for directing packets or frames in a wireless network based at least in part on destinations of the packets or frames. Moreover, the electronic device may include multiple controllers (such as processors) that operate as master nodes and that perform network functions for the stack of computer network devices using a database. This database may include a common database that is accessible by the multiple controllers or multiple instances of the database in the multiple controllers, where the multiple instances of the database are synchronized.

20 Claims, 8 Drawing Sheets

(56) References Cited

U.S. PATENT DOCUMENTS

| | | |
|---|---|---|
| 2015/0063334 A1 | 3/2015 | Vermani et al. |
| 2015/0063364 A1* | 3/2015 | Thakkar .............. H04L 45/7453 |
| | | 370/401 |
| 2015/0135185 A1 | 5/2015 | Sirota et al. |
| 2017/0206036 A1 | 7/2017 | Pax et al. |
| 2017/0206236 A1* | 7/2017 | Kharatishvili .......... G06F 16/27 |
| 2018/0176120 A1* | 6/2018 | Katz ...................... H04L 41/12 |

* cited by examiner

STACKED COMPUTER NETWORK DEVICES HAVING MULTIPLE MASTER NODES

CROSS-REFERENCE TO RELATED APPLICATION

This application claims priority under 35 U.S.C. 119(e) to: U.S. Provisional Application Ser. No. 62/872,585, "Stacked Computer Network Devices Having Multiple Master Nodes," filed on Jul. 10, 2019, by Christopher Dwane Thomas, et al., the contents of which are herein incorporated by reference.

BACKGROUND

Field

The described embodiments relate to techniques for communicating information among electronic devices, including using a stack of computer network devices (such as switches and/or routers) that have multiple master nodes and a shared database or multiple instances of the database that are synchronized.

Related Art

Many electronic devices are capable of wirelessly communicating with other electronic devices. For example, these electronic devices can include a networking subsystem that implements a network interface for: a cellular network (UMTS, LTE, etc.), a wireless local area network or WLAN, e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

Wireless networks, such as WLANs, often include switches or routers for directing packets or frames to their destinations. In some implementations, the data planes of the switches or routers (which are sometimes referred to as 'computer network devices') are stacked together or combined into a common unit. In this configuration, a single active controller in a control or management plane the stacked switches or routers (which is sometimes referred to as a 'master node') may perform compute logic and control the stacked switches or routers (which are sometimes referred to as 'network functions' or 'primary function decision making'), while the remaining controllers in control planes in the stacked switches or routers may not be used for primary function decision making.

However, in these implementations the master node can become a bottleneck or a single point of failure that can degrade communication performance, and which is frustrating for users.

SUMMARY

An electronic device is described. The electronic device includes a stack of computer network devices. This stack of computer network devices includes data planes and ports for directing packets or frames in a wireless network based at least in part on destinations of the packets or frames. Moreover, the electronic device may include multiple controllers (such as processors) that operate as master nodes and that perform network functions for the stack of computer network devices using a database. This database may include a common database that is accessible by the multiple controllers or multiple instances of the database in the multiple controllers, where the multiple instances of the database are synchronized.

Note that a given computer network device may be a switch or a router.

Moreover, the multiple controllers may operate as a computer cluster for the stack of computer network devices.

Furthermore, the network functions may include compute logic and control of the stack of computer network devices or primary function decision making for the stack of computer network devices. For example, the network functions may include: link aggregation, a spanning tree or media access control (MAC) address routing (such as from level two to level three in an Open System interconnection or OSI model), and/or copy or synchronization of a table (such as a state table) associated with the database. Note that at least one of the network functions may be distributed over the multiple controllers.

Additionally, the synchronization of the multiple instances of the database may be dynamic. For example, when a change is made to one of the multiple instances of the database, the multiple controllers may update the remaining instances of the database.

In some embodiments, an operating system of the multiple controllers may include a portion that depends on a type of hardware in the data planes (such as a type of integrated circuit) and a hardware-independent portion that performs the network functions. For example, the hardware-independent portion may implement the network functions using software processing.

Note that the multiple instances of the database may be stored on the multiple master nodes or a subset of the multiple master nodes.

Moreover, the multiple controllers may be included in at least a subset of the stack of computer network devices.

Furthermore, the stack of computer network devices may include a backplane with independent connections to the multiple controllers.

Additionally, the multiple controllers may dynamically change the number of controllers based at least in part on utilization of the multiple controllers or performance of the multiple controllers.

In some embodiments, a given controller implements and distributes a given network function.

Another embodiment provides a computer-readable storage medium for use with the electronic device. When executed by the electronic device, this computer-readable storage medium causes the electronic device to perform at least some of the aforementioned operations.

Another embodiment provides a method, which may be performed by the electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device is described. The electronic device includes a stack of computer network devices (such as switches or routers). This stack of computer network devices includes data planes and ports for directing packets or frames in a wireless network based at least in part on destinations of the packets or frames. Moreover, the electronic device may include multiple controllers (such as processors) that operate as master nodes and that perform network functions for the stack of computer network devices using a database. This database may include a common database that is accessible by the multiple controllers or multiple instances of the database in the multiple controllers, where the multiple instances of the database are synchronized.

By performing the network functions using multiple controllers that operate as master nodes and that share the database, this communication technique may improve the scalability of the stack of computer network devices. Moreover, these capabilities may provide improved communication performance (such as improved throughput, capacity, and/or robust communication) when using the electronic device in the wireless network (such as a WLAN). Consequently, the communication technique may improve the user experience when using the wireless network.

In the discussion that follows, the electronic device and other electronic devices in the wireless network (such as an access point or recipient electronic devices, which are sometimes referred to as 'clients') may communicate packets or frames in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used. The wireless communication may occur in a 2.4 GHz, a 5 GHz and/or a 60 GHz frequency band. (Note that IEEE 802.11ad communication over a 60 GHz frequency band is sometimes referred to as 'WiGig.' In the present discussion, these embodiments also encompassed by 'Wi-Fi.')

Moreover, the electronic device and/or the access point may communicate with one or more other access points and/or computers in the WLAN using a wireless or a wired communication protocol, such as an IEEE 802.11, an IEEE 802.3 standard (which is sometimes referred to as 'Ethernet') and/or another type of wired or wireless interface. In the discussion that follows, Ethernet is used as an illustrative example of communication between the electronic device and/or the access point and the one or more other access points and/or computers in the WLAN.

Figure 1:
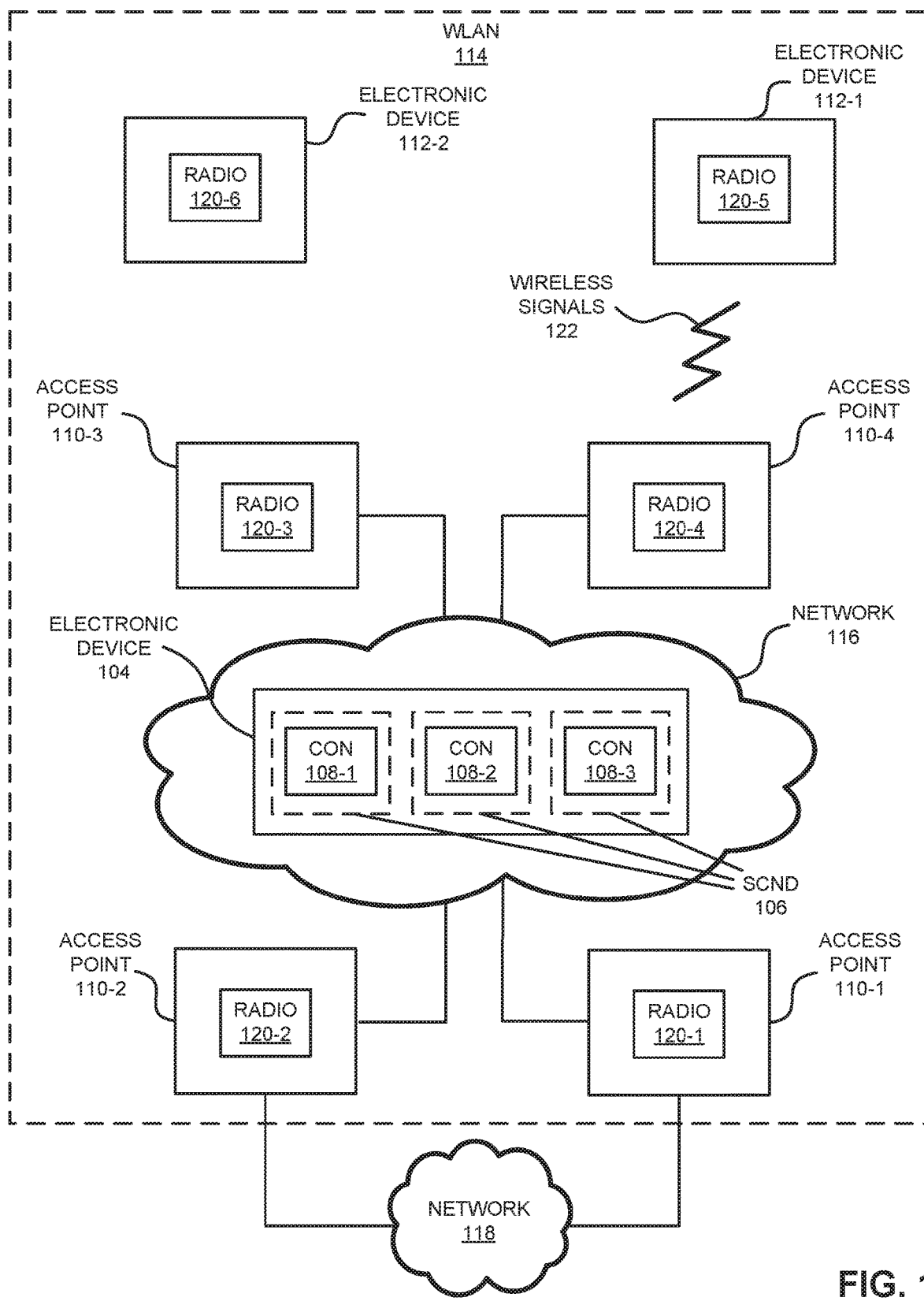
FIG. 1 is a block diagram illustrating an example of communication among access points and electronic devices in a wireless network in accordance with an embodiment of the present disclosure.

FIG. 1 presents a block diagram illustrating an example of communication among one or more access points 110 and electronic devices 112 (such as a cellular telephone, and which are sometimes referred to as 'clients') in a WLAN 114 in accordance with some embodiments. Access points 110 may communicate with each other in WLAN 114 using wireless and/or wired communication (such as by using Ethernet or a communication protocol that is compatible with Ethernet). Note that access points 110 may include a physical access point and/or a virtual access point that is implemented in software in an environment of an electronic device or a computer. In addition, at least some of access points 110 (such as access points 110-3 and 110-4) may communicate with electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. This network may include one or more routers and/or switches. For example, WLAN 114 may include an electronic device 104 with a stack of computer network devices (SCND) 106, such as a stack of switches and/or routers. Furthermore, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wired and/or wireless communication among access points 110 also involves the use of dedicated connections, such as via a peer-to-peer (P2P) communication technique. Therefore, access points 110 may support wired communication within WLAN 114 (such as Ethernet) and wireless communication within WLAN 114 (such as Wi-Fi), and one or more of access points 110 may also support a wired communication protocol for communicating via network 118 with electronic devices (such as a computer or a controller of WLAN 114, which may be remoted located from WLAN 114).

Figure 8:
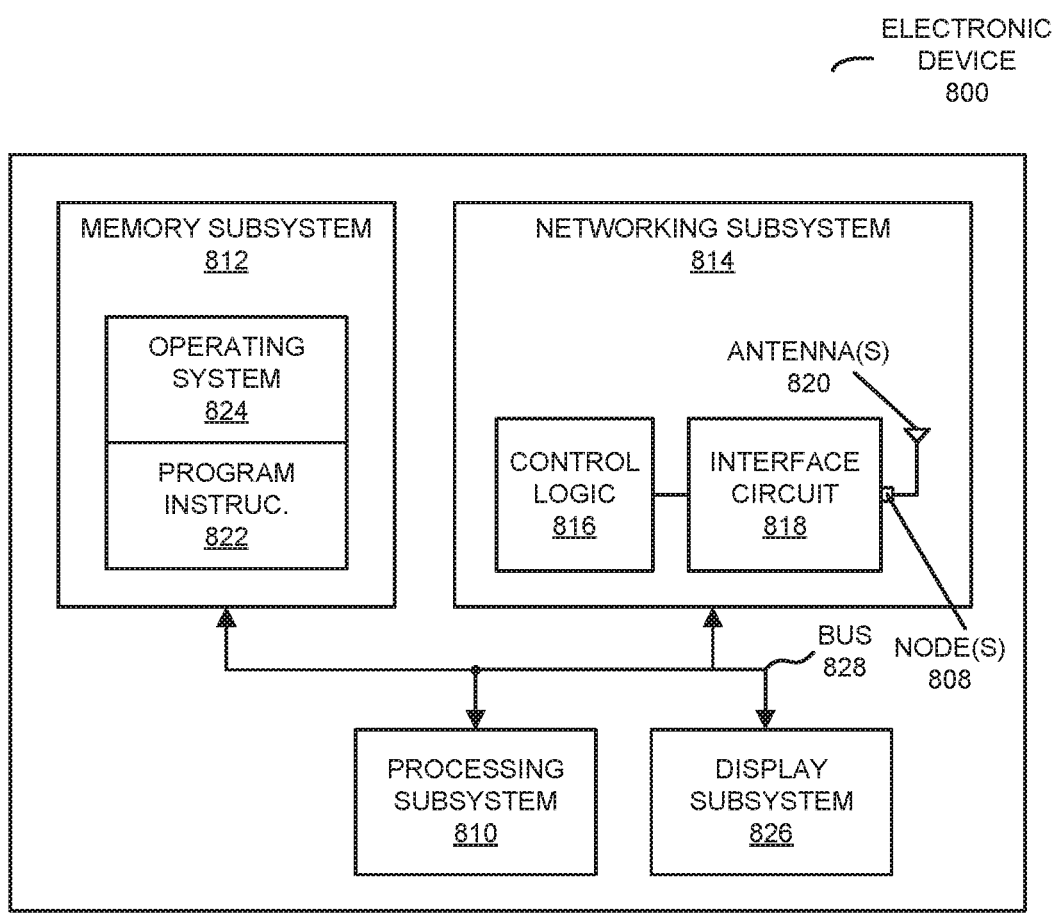
FIG. 8 is a block diagram illustrating an example of an electronic device in accordance with an embodiment of the present disclosure.

As described further below with reference to FIG. 8, electronic device 104, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in electronic device 112-1. Notably, access point 110-4 may transmit packets or frames. In turn, these packets or frames may be received by electronic device 112-1. Moreover, access point 110-4 may allow electronic device 112-1 to communicate with other electronic devices, computers and/or servers via networks 116 and/or 118.

Note that the communication among access points 110 and/or with electronic devices 112 (and, more generally, communication among components in WLAN 114) may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving signals (such as wireless signals 122) with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, depending on the activity in WLAN 114 and/or network 118, existing stacks of switches and/or routers with a single active controller that operates as a master node can become a bottle neck that degrades communication performance within WLAN 114, and/or between WLAN 114 and network 118. Alternatively or additionally, such a single active controller can be a single point of failure that can also degrade the communication performance.

As described further below with reference to FIGS. 2-7, in order to address these problems, electronic device 104 may include a stack of computer network devices 106. A given computer network device in the stack of computer network devices 106 may include a data plane and ports for directing packets or frames in WLAN 114 based at least in part on destinations of the packets or frames. Moreover, electronic device 104 may include multiple controllers 108 (CON), such as processors, that operate as master nodes and that perform network functions for the stack of computer network devices using a database (or, in some embodiments, a set of one or more accessible data structures). The database may include a common database that is accessible by the multiple controllers 108 or multiple instances of the database in the multiple controllers 108, where the multiple instances of the database are synchronized. In the present discussion, note that a given master node may coordinate the activities of its peer nodes (in this case, control planes in one or more of the computer network devices or one or more of the other master nodes) either independently of or in conjunction with at least a subset of the other master nodes.

Note that the multiple instances of the database may be stored on the multiple master nodes or a subset of the multiple master nodes. Moreover, the multiple controllers 108 may be included in at least a subset of the stack of computer network devices 106, such as in control planes of the subset of the stack of computer network devices 106.

Furthermore, the multiple controllers 108 may operate as a computer cluster for the stack of computer network devices 106. For example, the multiple master nodes may be clustered, e.g., via a command line or a configuration line command or operation that defines a management cluster of master nodes (such as 'join master'). In this way, e.g., six of the twelve computer network devices in stack 106 may be defined or specified as master nodes or units based at least in part on their identifiers and/or their positions (such as top to bottom) in stack 106.

Additionally, a given controller may implement, perform and/or distribute a given network function. However, in general, at least one of the network functions may be modular, so that it can be implemented, performed by or distributed to one or more the multiple controllers 108.

In some embodiments, the network functions may include compute logic and control of the stack of computer network devices 106 or, equivalently, what is sometimes referred to as 'primary function decision making' for the stack of computer network devices 106. For example, the network functions may include: link aggregation (which may be performed by an individual master node), a spanning tree or MAC address routing (such as from level two to level three in an OSI model), application tasks during cooperative scheduling, and/or copy or synchronization of a table (such as a state table) associated with the multiple instances of the database. Note that the synchronization of the state tables may ensure interoperability with other systems.

Moreover, the synchronization of the multiple instances of the database may be dynamic. For example, when a change is made to one of the multiple instances of the database, one or more of the multiple controllers 108 may update the remaining instances of the database.

Furthermore, an operating system of the multiple controllers 108 may include a portion that depends on a type of hardware in the data planes (such as a type of integrated circuit) and a hardware-independent portion that performs the network functions. For example, the hardware-independent portion may implement the network functions using software processing.

In some embodiments, the stack of computer network devices may include a backplane with independent connections to the multiple controllers 108.

Moreover, the multiple controllers 108 may dynamically change the number of controllers 108 based at least in part on utilization of the multiple controllers 108 or performance of the multiple controllers 108.

In this way, electronic device 104 may allow a stack of computer network devices to be scaled, as needed, based at least in part on system requirements in order to maintain performance in WLAN 114 and may allow network functions to be virtualized in a cluster of controllers. For example, the communication technique may allow computing resources to be added to the stack of computer network devices to meet a dynamic performance need for a wireless environment. Consequently, the communication technique may help maintain communication performance in WLAN 114, which may increase customer satisfaction and retention.

Figure 2:
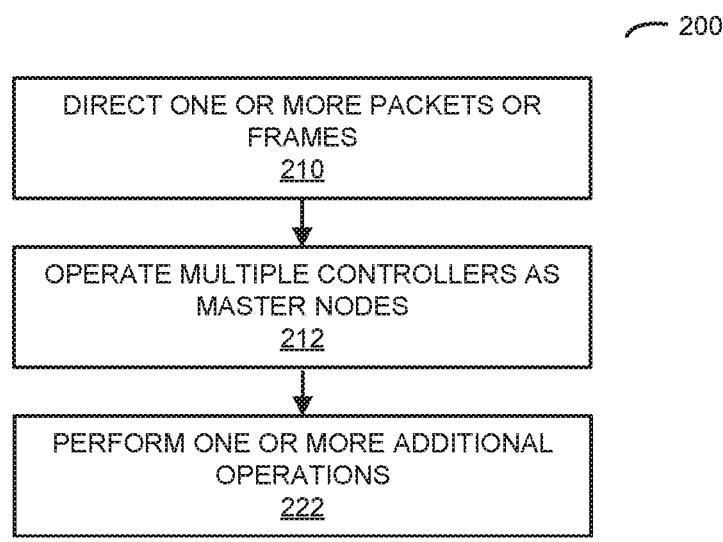
FIG. 2 is a flow diagram illustrating an example of a method for performing network functions using an electronic device in FIG. 1 in accordance with an embodiment of the present disclosure.

We now describe embodiments of a method. FIG. 2 presents a flow diagram illustrating an example of a method 200 for performing network functions using an electronic device that includes a stack of computer network devices (such as switches and/or routers) with data planes and ports, such as electronic device 104 in FIG. 1.

During operation, the electronic device may direct, using the stack of computer network devices, one or more packets or frames (operation 210) in a wireless network based at least in part on destinations of the packets or frames.

Moreover, the electronic device may operate multiple controllers as master nodes (operation 212) that perform network functions for the stack of computer network devices using a database, where the database includes a common database that is accessible by the multiple controllers, or multiple instances of the database in the multiple controllers, and where the multiple instances of the database are synchronized. Note that the multiple instances of the database may be stored on the multiple master nodes or a subset of the multiple master nodes.

For example, the multiple controllers may operate as a computer cluster for the stack of computer network devices.

The network functions may include compute logic and control of the stack of computer network devices or primary function decision making for the stack of computer network devices. For example, the network functions may include: link aggregation, a spanning tree or MAC address routing (such as from level two to level three in an OSI model), application tasks during cooperative scheduling, and/or copy or synchronization of a table (such as a state table) associated with the database. Note that at least one of the network functions may be distributed over the multiple controllers.

Furthermore, the synchronization of the multiple instances of the database may be dynamic. For example, when a change is made to one of the multiple instances of the database, one or more of the multiple controllers may update the remaining instances of the database.

Additionally, an operating system of the multiple controllers may include a portion that depends on a type of hardware in the data planes (such as a type of integrated circuit) and a hardware-independent portion that performs the network functions. For example, the hardware-independent portion may implement the network functions using software processing.

In some embodiments, the multiple controllers may be included in at least a subset of the stack of computer network devices. For example, the multiple controllers may be included in control planes in the subset of the stack.

Moreover, the stack of computer network devices may include a backplane with independent connections to the multiple controllers.

Furthermore, a given controller may implement and/or distribute a given network function.

In some embodiments, the electronic device may optionally perform one or more additional operations (operation 214). For example, the multiple controllers may dynamically change the number of controllers based at least in part on utilization of the multiple controllers or performance of the multiple controllers.

Figure 3:
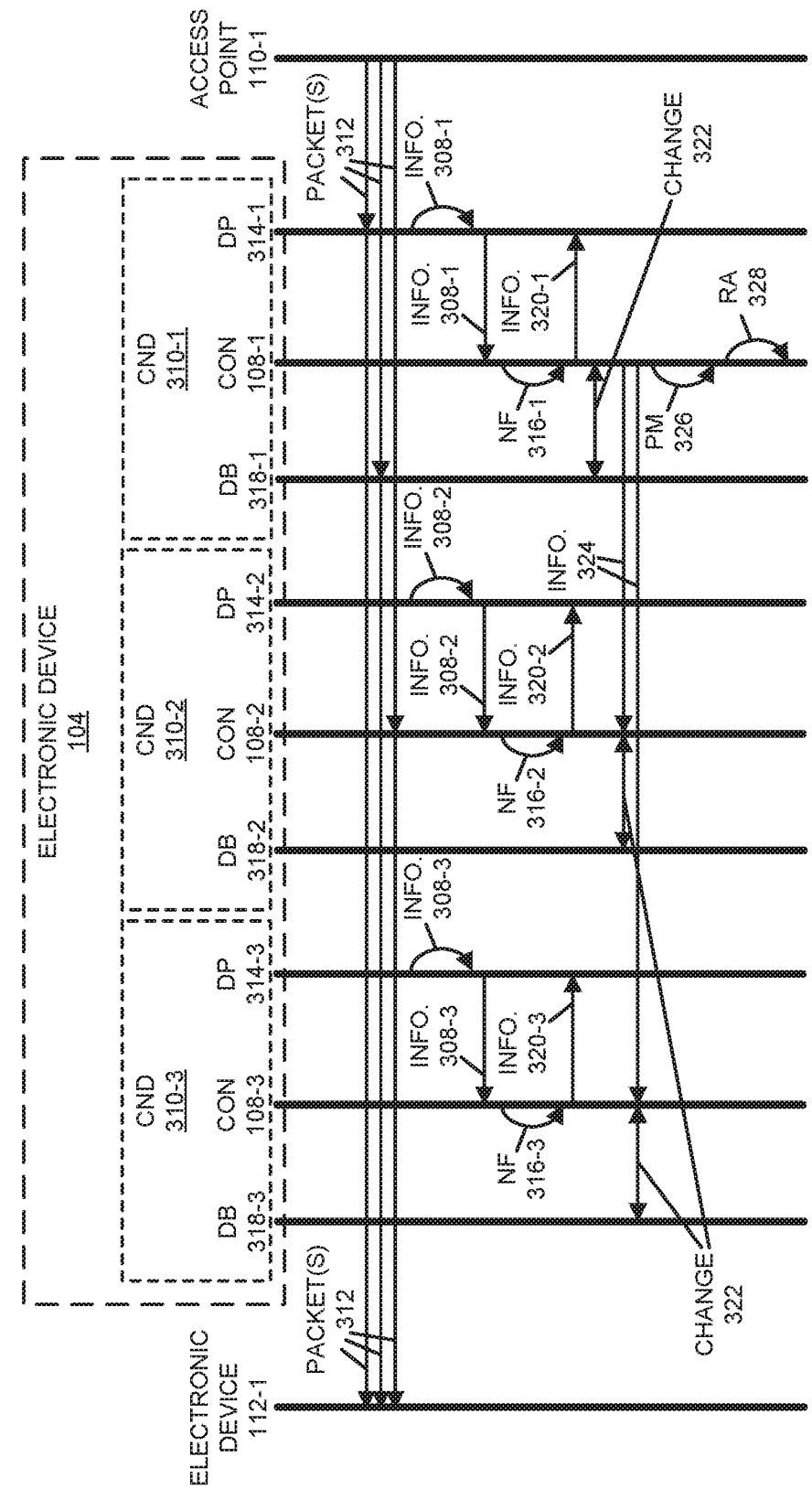
FIG. 3 is a drawing illustrating an example of communication among components in an electronic device in FIG. 1 in accordance with an embodiment of the present disclosure.

FIG. 3 presents a drawing illustrating an example of communication among components in electronic device 104, access points 110-1 and electronic device 112-1. Notably, access point 110-1 may communicate one or more packets 312 or frames with electronic device 112-1.

The one or more packets 312 may be received by one or more data planes (DP) 314 in computer network devices 310 in electronic device 104. Note that the one or more data planes 314 may direct the one or more packets 312 to their destination (i.e., electronic device 112-1). In some embodiments, the one or more data planes 314 may provide information 308 from or about the one or more packets 312 to the multiple controllers 108 in computer network devices 310 for use in network functions 316.

Moreover, the multiple controllers 108 may operate as master nodes and may perform network functions (NFs) 316 for computer network devices 310 using at least a database (DB) 318 in at least in a memory in computer network device 310-1 (such as in controller 108-1). During a given network function, one or more of controllers 108 may provide instructions or information 320 to one or more of data planes 314.

Database 318 may include a common database in computer network device 310-1 that is accessible by the multiple controllers 108. Alternatively, as shown in FIG. 3, multiple instances of the database 318 may be stored in memories in computer network devices 310-1, 310-2 and 310-3 (such as in controller 108-1, 108-2 and 108-3). These multiple instances of database 318 may be synchronized with each other by the multiple controllers 108. Notably, when a change 322 is made to one of the multiple instances of the database 318 (such as by controller 108-1), one or more of the multiple controllers 108 (such as controller 108-1) may update the remaining instances of the database, e.g., by providing update information 324 to the remaining controllers 108-2 and 108-2, so that these controllers can implement change 322 in their instances of the database 318.

Note that in some embodiments network functions 316 may include: link aggregation a spanning tree or MAC address routing, application tasks during cooperative scheduling, and/or copy or synchronization of a table (such as a state table) associated with the multiple instances of the database 318.

Furthermore, the multiple controllers 108 may operate as a computer cluster for the computer network devices 310. Additionally, a given controller (such as controller 108-1) may perform a given network function. However, in general, at least one of the network functions may be modular, so that it can be implemented, performed by or distributed to one or more the multiple controllers 108.

Additionally, the multiple controllers 108 may dynamically change the number of controllers 108 based at least in part on utilization of the multiple controllers 108 or performance of the multiple controllers 108. For example, controller 108-1 may determine or monitor at least a performance metric (PM) 326 (such as utilization, throughput, queue depth, etc.) of the multiple controller 108, and may perform a remedial action (RA) 328, such as selectively adding another controller as a master node based at least in part on performance metric 326.

While FIG. 3 illustrates communication between components using unidirectional or bidirectional communication with lines having single arrows or double arrows, in general the communication in a given operation in these figures may involve unidirectional or bidirectional communication.

In existing stacked switches or routers, the majority of the control plane data and logic decisions may be performed by an active controller (such as a single core in a processor), with a standby controller identified based at least in part on the stacking priority. The other controllers in the stack may be stack members that are not used for the primary function of decision making as they would be in a standalone configuration.

Figure 4:
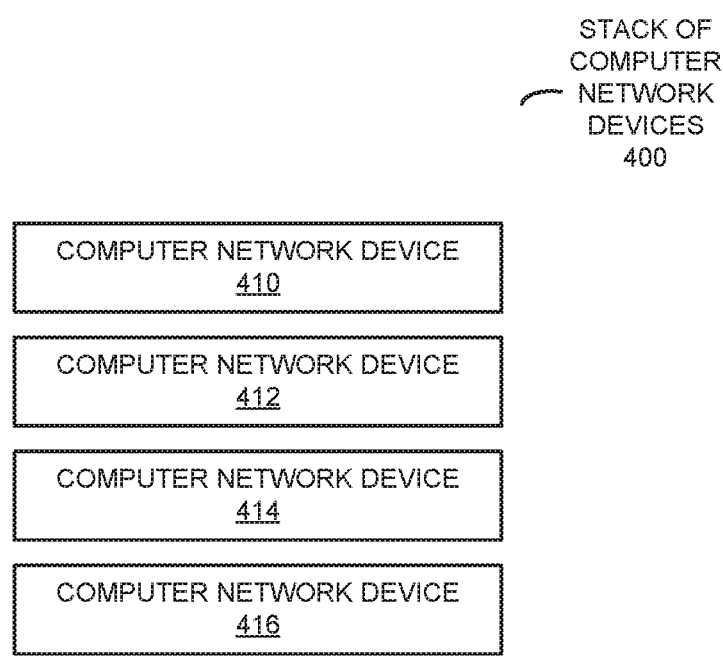
FIG. 4 is a drawing illustrating a stack of computer network devices in accordance with an embodiment of the present disclosure.

FIG. 4 presents a drawing illustrating an example of a stack of computer network devices 400 in an electronic device. As shown in FIG. 4, a controller in a computer network device 410 may be the active unit that controls all the devices or units in the stack. The active unit may receive all protocol packets and may maintain the protocol states. Moreover, the active unit may program the hardware in the other units (such as other computer network devices 412, 414 and 416) via software messaging. Note that a controller in computer network device 412 may be a standby in a hot state for high-availability functionality, while controllers in computer network devices 414 and 416 may be members of stack 400.

As noted previously, controller 410 may be the single active process in stack 400. However, the use of a single process (such as a single core in a processor) may provide a single point of failure. Notably, any exception occurring in a functional area may bring down an entire unit. Alternatively, even if there isn't a failure, an activity or task that causes the active unit to become busy may cause control protocols and the stack to become unstable. For example, when a task takes more time (such as cooperative scheduling), protocol errors or task starvation of other tasks may occur (i.e., the controller in computer network device 410 may become a bottleneck for the software functionality).

Moreover, there is an opportunity cost in this architecture or configuration of stack 400. Notably, controllers or processors in computer network devices 412, 414 and 416 may be unused. Furthermore, sometimes a fail over/switch over, such as to a controller in computer network device 412, may cause a disruption and, thus, can present another failure mechanism. For example, it may be difficult to maintain synchronization of the states of the controllers in computer network devices 410, 412, 414 and 416 because execution of application software for synchronization may be executed differently (such as at different times) by these devices, which can cause sequencing and synchronization errors. Notably, while the controllers in computer network devices 410 and 412 may be synchronized, it may be more difficult to maintain synchronization between the controller in computer network devices 410, 414 and 416.

These problems may be addressed by using multiple active controllers to distribute the logic processing across multiple stacked computer network devices to increase capacity and scale. For example, a stack of computer network devices may include twelve units. Instead of using a single core to execute the network operating system, three additional cores may also be used. In general, the number of active controllers or master nodes may be based at least in part on the number of computer network devices in the stack.

By distributing the role of master node to multiple 'active' controllers, the communication may provide increased scalability and capacity. For example, open shortest path first (OSPF) routing functions may be separated or designated to operate on 'active' controller 1 in a six unit stack. Then, border gateway protocol (BGP) functions may operate on or may be controlled by 'active' controller 2. Moreover, stacking and stack control traffic functions may operate on or may be executed on 'active' controller 3. This approach may treat the 'active' controllers as a cluster computer node.

In some embodiments, the use of multiple controllers in the stack of computer network devices may have independent physical connections to the controllers to provide backplane communications between both the individual 'active' controller processors and, e.g., an ASIC. Alternatively or additionally, the communication may occur over one or more optical links, such as quad (4-channel) small form-factor pluggable (QSFP) or QSFP+. In some embodiments, software executed by one or more of the multiple controllers may monitor controller utilization and/or performance and may dynamically elect an additional 'active' controller to the stack if another controller is available in the stack.

Figure 5:
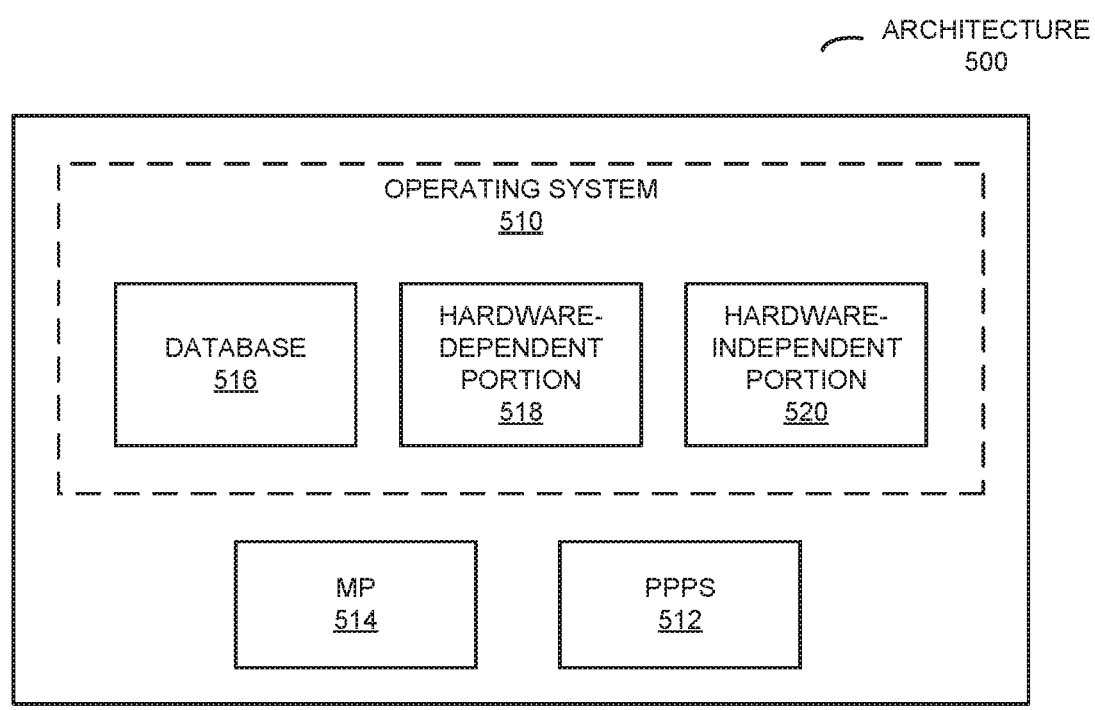
FIG. 5 is a drawing illustrating an example of an architecture of an electronic device in FIG. 1 in accordance with an embodiment of the present disclosure.

FIG. 5 presents a drawing illustrating an example of an architecture 500 of electronic device 104 (FIG. 1). In this architecture, there may be an operating system 510, packet processor ports (PPP) 512 and an optional management port (MP) 514. Moreover, the operating system may include a database 516 (or an instance of a shared database), a hardware (or platform)-dependent portion 518 that depends on a type of hardware in the data planes (such as a type of integrated circuit) and a hardware (or platform)-independent portion 520 that performs the network functions. For example, the hardware-independent portion 520 may implement the network functions using software processing, while the hardware-dependent portion 518 portion may perform hardware processing. Note that database 516 may be a central distributed database that stores information related to hot swap, hitless synchronization infrastructure and/or inter-process notifications. In some embodiments, database 516 may support periodic save to persistent storage.

Moreover, in architecture 500, tasks in other processes may be free running and may use all the processor cores or controllers. Furthermore, stacking and system functionality may be implemented in the hardware-dependent portion 518 and may run as free running tasks. Additionally, hardware programming associated with an application may be implemented in the hardware-dependent portion 518 and may run as free running tasks. For example, hardware programming may be in an independent task in the hardware-dependent portion 518, and hardware system monitoring functionality may be decoupled as an independent task in the hardware-dependent portion 518. In some embodiments, the multiple controllers that implement the process that uses architecture 500 may be restarted without impact to the data plane(s).

Note that separating software functionality as hardware-dependent and hardware-independent may reduce the system impact of future development or bug fixes. Moreover, this architecture may provide improved scaling and may reduce protocol flaps associated with high controller or processor usage.

Figure 6:
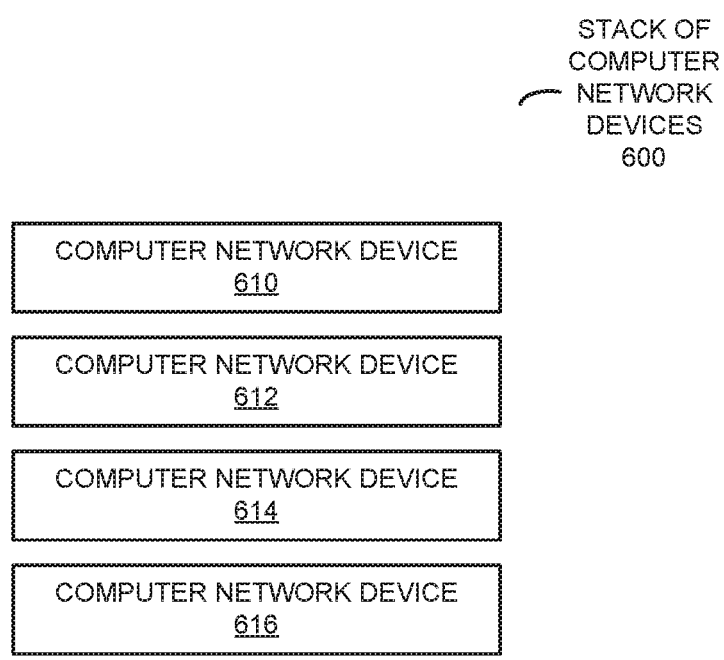
FIG. 6 is a drawing illustrating an example of a stack of computer network devices in an electronic device in FIG. 1 in accordance with an embodiment of the present disclosure.
Figure 7:
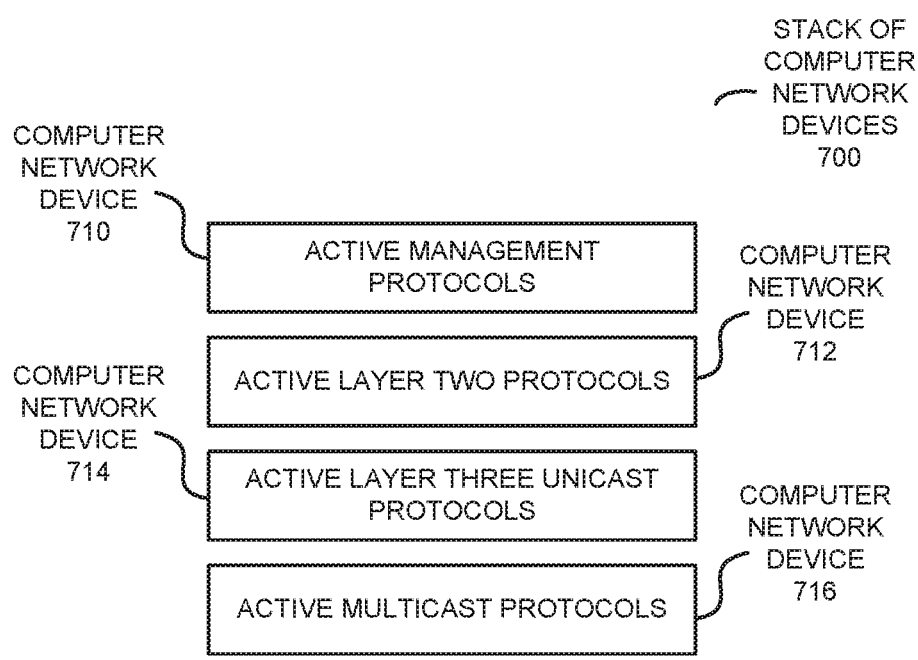
FIG. 7 is a drawing illustrating an example of a stack of computer network devices in an electronic device in FIG. 1 in accordance with an embodiment of the present disclosure.

FIG. 6 presents a drawing illustrating an example of a stack of computer network devices 600 in electronic device 104 (FIG. 1) that uses architecture 500 (FIG. 5). During reboot, stack 600 may include an active computer network device 610, while the remaining computer network device 612, 614 and 616 may be members of stack 600. Then, as shown in FIG. 7, which presents a drawing illustrating an example of a stack of computer network devices 700 in electronic device 104 (FIG. 1) that uses architecture 500 (FIG. 5), during operation there may be multiple 'active' controllers that operate as master nodes. For example, computer network device 710 may perform active management protocols and may be the main orchestrator, computer network device 712 may perform active layer two protocols, computer network device 714 may perform active layer three unicast protocols, and computer network device 716 may perform active multicast protocols.

Architecture 500 (FIG. 5) may support core stacking functionality, including: independent execution, handling stacking link initialization, topology discovery and stack formation. In some embodiments, the stacking link initialization, topology discover and stack formation may be performed with the system starts. After stack formation is completed, each unit may have its configuration synchronized and hot swapped, so that the multiple controllers in the computer network devices have the same state.

The distributed database may have multiple functions. Notably, the database may maintain the configuration across the controllers, e.g., hot swap and hitless synchronization of application data across the controllers. Moreover, the distributed database may maintain the integrity of shared data structure information across the controllers.

Furthermore, the distributed database may propagate application software changes. In some embodiments, application hardware-independent processing may occur in a unit assigned as the master for this functionality by a thread distributor. Additionally, hardware-dependent entries may be added into the distributed database. The distributed database may synchronize these entries to the controllers or to the units (e.g., the computer network devices) and may notify registered tasks. Moreover, the hardware-dependent task may receive notification from the distributed database and may perform stack-unit-specific processing.

A task or task group (functionality) that uses the distributed database to maintain its state or that interfaces with other functionality may run on one or more of the multiple controllers. When the stack of switches and/or or routers boots up, the tasks or task groups may execute in the main orchestrator. Then, once the database synchronization to the multiple controllers is complete, mastership of the tasks or task-groups may be transitioned or moved to one or more of the remaining controllers. Note that a task or task group may execute in one or more of the multiple controllers for distribution of software functionality.

Moreover, switchover functionality may occur per task-group. This may transition or moves the mastership of a task or task-group to a particular controller. Furthermore, failover may occur in increasing order of recovery time. If the hardware-independent portion crashes, mastership tasks or task groups may transfer to another controller without functional impact. Furthermore, if the hardware-dependent portion crashes, the process may restart, which may result in delayed hardware processing. Additionally, if the distributed database crashes, the process may restart and synchronization via hot swap may occur from peer data stored in persistent memory. Note that stacking core functionality and inter-process communication may execute as independent layers, thereby reducing errors.

The use of a distributed database may offer several benefits, including: a single channel for synchronization of information to the multiple controllers; hitless and hot swap functionality may be independent; and/or data synchronization integrity issues may be detected and/or corrected at runtime.

Moreover, the stacked system may offer increased reliability, because there is no longer a single point of failure. Instead, there is one-to-many backup available for control-path functionality. Furthermore, the stack may not need to execute a cold reload that can adversely impact the data plane(s).

Addition, the communication technique may provide scaling and distribution benefits. For example, software functionality may be distributed in different units. Consequently, the stacked system may have improved scaling, both in terms of protocol limits and the number of units that could be supported in a stack.

In some embodiments, software may be distributed with an instance of a particular functionality running in each unit. Alternatively, in some embodiments, software may be distributed with a few instances of functionality running that manage the needs for all the stacked units.

Moreover, in some embodiments, when a hardware-independent task is performing processing that changes hardware, an application programming interface (API) call may be made to a database task to add an entry to a database. Then, the database task may add the entry to a table associated with the request. Next, the database task may provide notifications to the hardware-independent task and a hardware-dependent task. Furthermore, the hardware-dependent task may process one or more requests and may perform any necessary conversions so that the one or more requests can be communicated to, e.g., an interface circuit via an associated API.

In some embodiments, when a hardware-independent task in a controller is performing processing that changes hardware, an API call may be made to a database task in the controller to add an entry to a database. Then, the database task may add the entry to a table associated with the request. Next, the database task may use a synchronization table to notify peer units (such as other controllers), and may provide notifications to the hardware-independent task and a hardware-dependent task in the controller. Furthermore, the hardware-dependent task may process one or more requests and may perform any necessary conversions so that the one or more requests can be communicated to, e.g., an interface circuit via an associated API.

Additionally, database tasks in the other controllers may receive the change to the synchronization table. In response, a given database task in a given one of the other controllers may add the entry to a table associated with the request. Next, the given database task may provide notifications to the hardware-independent task and a given hardware-dependent task. Furthermore, the given hardware-dependent task may process one or more requests and may perform any necessary conversions so that the one or more requests can be communicated to, e.g., an interface circuit via an associated API.

We now describe embodiments of an electronic device, which may perform at least some of the operations in the communication technique. FIG. 8 presents a block diagram illustrating an example of an electronic device 800 in accordance with some embodiments, such as one of electronic device 104, one of access points 110 or one of electronic devices 112. This electronic device includes processing subsystem 810, memory subsystem 812, and networking subsystem 814. Processing subsystem 810 includes one or more devices configured to perform computational operations. For example, processing subsystem 810 can include one or more microprocessors, ASICs, microcontrollers, programmable-logic devices, one or more graphics process units (GPUs) and/or one or more digital signal processors (DSPs).

Memory subsystem 812 includes one or more devices for storing data and/or instructions for processing subsystem

810 and networking subsystem 814. For example, memory subsystem 812 can include dynamic random access memory (DRAM), static random access memory (SRAM), and/or other types of memory. In some embodiments, instructions for processing subsystem 810 in memory subsystem 812 include: one or more program modules or sets of instructions (such as program instructions 822 or operating system 824), which may be executed by processing subsystem 810. Note that the one or more computer programs may constitute a computer-program mechanism. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, an interface circuit 818 and one or more antennas 820 (or antenna elements). (While FIG. 8 includes one or more antennas 820, in some embodiments electronic device 800 includes one or more nodes, such as nodes 808, e.g., a network node that can be coupled or connected to a network or link, or an antenna node or a pad that can be coupled to the one or more antennas 820. Thus, electronic device 800 may or may not include the one or more antennas 820.) For example, networking subsystem 814 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 800 may be adapted or changed using pattern shapers (such as reflectors) in one or more antennas 820 (or antenna elements), which can be independently and selectively electrically coupled to ground to steer the transmit antenna pattern in different directions. Thus, if one or more antennas 820 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 800 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices as described previously.

Within electronic device 800, processing subsystem 810, memory subsystem 812, and networking subsystem 814 are coupled together using bus 828. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes a display subsystem 826 for displaying information on a display, which may include a display driver and the display, such as a liquid-crystal display, a multi-touch touchscreen, etc.

Electronic device 800 can be (or can be included in) any electronic device with at least one network interface. For example, electronic device 800 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a computer network device, a stack of computer network devices, an access point, a controller, test equipment, and/or another electronic device.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments program instructions 822 are included in operating system 824 and/or control logic 816 is included in interface circuit 818. In some embodiments, the communication technique is implemented using information in layer 2 and/or layer 3 of the OSI model.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 814 (or, more generally, of electronic device 800). The integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 822, operating system 824 (such as a driver for interface circuit 818) or in firmware in interface circuit 818. Alternatively or additionally, at least some of the operations in the communication technique may be implemented in a physical layer, such as hardware in interface circuit 818.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a stack of computer network devices, wherein a given computer network device comprises a data plane and ports configured to direct packets or frames in a wireless network based at least in part on destinations of the packets or frames; and
multiple controllers configured to operate as master nodes and to perform network functions for the stack of computer network devices using a database, wherein, for at least a subset of the network functions, the controllers perform different network functions from each other,
wherein the database comprises multiple instances of the database in the multiple controllers,
wherein the multiple instances of the database are synchronized, propagate software changes to the controllers, and provide hot swap and hitless synchronization of application data, and
wherein the multiple controllers are configured to selectively add another master node based at least in part on a performance metric associated with the stack of computer network devices.

2. The electronic device of claim 1, wherein the given computer network device comprises a switch or a router.

3. The electronic device of claim 1, wherein the multiple controllers are configured to operate as a computer cluster for the stack of computer network devices.

4. The electronic device of claim 1, wherein the network functions comprise compute logic and control of the stack of computer network devices.

5. The electronic device of claim 1, wherein the network functions comprise: link aggregation, media access control (MAC) address routing, or synchronization of a table associated with the database.

6. The electronic device of claim 1, wherein at least one of the network functions is distributed over the multiple controllers.

7. The electronic device of claim 1, wherein the synchronization of the multiple instances of the database is dynamic so that, when a change is made to one of the multiple instances of the database, the multiple controllers update the remaining instances of the database.

8. The electronic device of claim 1, wherein an operating system of the multiple controllers comprises a portion that depends on a type of hardware in data planes of the stack of computer network devices and a hardware-independent portion that performs the network functions.

9. The electronic device of claim 1, wherein the multiple instances of the database are stored on the multiple master nodes or a subset of the multiple master nodes.

10. The electronic device of claim 1, wherein the multiple controllers are included in at least a subset of the stack of computer network devices.

11. The electronic device of claim 1, wherein the stack of computer network devices comprises a backplane with independent connections to the multiple controllers.

12. The electronic device of claim 1, wherein the multiple controllers are configured to dynamically change a number of controllers based at least in part on utilization of the multiple controllers or performance of the multiple controllers.

13. The electronic device of claim 1, wherein, when the electronic device reboots, a master orchestrator in the controllers is configured to perform the network functions and, after synchronization of the database, at least the subset of the network functions are transitioned to the different controllers.

14. A non-transitory computer-readable storage medium for use in conjunction with an electronic device that comprises a stack of computer network devices with data planes and ports, the computer-readable storage medium storing program instructions that, when executed by the electronic device, causes the electronic device to perform operations comprising:
directing, using the stack of computer network devices, packets or frames in a wireless network based at least in part on destinations of the packets or frames;
operating multiple controllers as master nodes that perform network functions for the stack of computer network devices using a database, wherein, for at least a subset of the network functions, the controllers perform different network functions from each other,
wherein the database comprises multiple instances of the database in the multiple controllers, and
wherein the multiple instances of the database are synchronized, propagate software changes to the controllers, and provide hot swap and hitless synchronization of application data; and
selectively adding, using the multiple controllers, another master node based at least in part on a performance metric associated with the stack of computer network devices.

15. The non-transitory computer-readable storage medium of claim 14, wherein the multiple controllers operate as a computer cluster for the stack of computer network devices.

16. The non-transitory computer-readable storage medium of claim 14, wherein the network functions comprise: link aggregation, media access control (MAC) address routing, or synchronization of a table associated with the database.

17. The non-transitory computer-readable storage medium of claim 14, wherein at least one of the network functions is distributed over the multiple controllers.

18. The non-transitory computer-readable storage medium of claim 14, wherein the synchronization of the multiple instances of the database is dynamic so that, when a change is made to one of the multiple instances of the database, the multiple controllers update the remaining instances of the database.

19. The non-transitory computer-readable storage medium of claim 14, wherein the multiple controllers dynamically change a number of controllers based at least in part on utilization of the multiple controllers or performance of the multiple controllers.

20. A method for performing network functions, comprising
by an electronic device that comprises a stack of computer network devices with data planes and ports:
directing, using the stack of computer network devices, packets or frames in a wireless network based at least in part on destinations of the packets or frames;
operating multiple controllers as master nodes that perform network functions for the stack of computer network devices using a database, wherein, for at least a subset of the network functions, the controllers perform different network functions from each other,
wherein the database comprises multiple instances of the database in the multiple controllers, and
wherein the multiple instances of the database are synchronized, propagate software changes to the controllers, and provide hot swap and hitless synchronization of application data; and
selectively adding, using the multiple controllers, another master node based at least in part on a performance metric associated with the stack of computer network devices.

* * * * *